US006633385B2

(12) United States Patent
Trépanier

(10) Patent No.: US 6,633,385 B2
(45) Date of Patent: Oct. 14, 2003

(54) SYSTEM AND METHOD FOR RECORDING INTERFERENCE FRINGES IN A PHOTOSENSITIVE MEDIUM

(75) Inventor: François Trépanier, Cap Rouge (CA)

(73) Assignee: Teraxion Inc., Quebec (CA)

( * ) Notice: Subject to any disclaimer, the term of this patent is extended or adjusted under 35 U.S.C. 154(b) by 0 days.

(21) Appl. No.: 09/975,836

(22) Filed: Oct. 11, 2001

(65) Prior Publication Data

US 2003/0072003 A1 Apr. 17, 2003

(51) Int. Cl.[7] .................................................. G01B 9/02
(52) U.S. Cl. ...................................................... 356/450
(58) Field of Search ................................ 356/450, 491; 359/9

(56) References Cited

U.S. PATENT DOCUMENTS

| | | | |
|---|---|---|---|
| 4,093,338 A | 6/1978 | Bjorklund et al. | 350/3.7 |
| 5,363,239 A | 11/1994 | Mizrahi et al. | 359/570 |
| 5,479,273 A | * 12/1995 | Ramsbottom | 359/9 |
| 5,822,479 A | * 10/1998 | Napier et al. | 385/37 |

OTHER PUBLICATIONS

Adel Asseh, et al., "A Writing Technique For Long Fiber Bragg Gratings With Complex Reflectivity Profiles" Journal of Lightwave Technology, vol. 15, No. 8, Aug. 1997, pp. 2–6.

* cited by examiner

*Primary Examiner*—Frank G. Font
*Assistant Examiner*—Michael A. Lyons
(74) *Attorney, Agent, or Firm*—Darby & Darby

(57) ABSTRACT

A system and a method for recording interference fringes in a photosensitive medium. Two light beams are guided along different light paths to impinge on a photosensitive medium, where they interfere to produce the interference fringes. One of the beam is reflected along its path on a delay mirror forming a fixed angle φ with respect to the plane of the photosensitive medium. Both the photosensitive medium and delay mirror are translated with respect to the light paths of the two beams, thereby recording the interference fringes all along the medium. The angle φ is chosen so that the interference pattern is fixed relative to the photosensitive medium along its length.

14 Claims, 3 Drawing Sheets

SYSTEM AND METHOD FOR RECORDING INTERFERENCE FRINGES IN A PHOTOSENSITIVE MEDIUM

FIELD OF THE INVENTION

The present invention relates to the recording of interference patterns into photosensitive media, and more particularly concerns an interferometric scanning system and a corresponding method for recording long gratings into such media.

BACKGROUND OF THE INVENTION

Many optical elements may be fabricated by impinging a light beam onto a photosensitive medium to modify its optical, chemical or mechanical properties. A common application of such a technique is to make diffraction gratings for use in spectroscopic, meteorological and optical communication instruments as well as other types of systems having a use for such diffraction gratings. A very popular type of grating is the fiber Bragg grating used in optical telecommunication systems and devices.

Manufacture of gratings by interferometric methods has been well known for many years. The most common of such methods is by using two generally expanded collimated laser light beams incident on the photosensitive material. After exposure, the photosensitive material is properly processed to obtain a volume or relief structure grating, depending on the photosensitive material used.

This method has many drawbacks, especially for the manufacturing of large area gratings (over 50 mm maximum dimension). Since the laser beam usually has a gaussian intensity profile, it has to be sufficiently expanded in order to provide a quasi-uniform illumination over the entire recording area. Also, a larger beam means larger optics, which are more expensive to obtain in a defect-free form. The surface quality and cleanness of the required optics (mirrors, lens) is also very critical for the production of noise-free gratings. Even though noise-free gratings may be made using spatially filtered non-collimated diverging beams, the result usually gives a non-uniform pitch distribution over the grating length.

To eliminate the need for large collimating optics, U.S. Pat. No. 4,093,338 (Bjorklund et al.) and more recently 5,363,239 (Mizrahi et Mollenauer) both disclose a technique using small scanning laser beams. Using a beamsplitter and very flat mirrors, the beam is split into two beams, which are then redirected to interfere on the recording plane. By precisely moving the mirror laterally, it is possible to move the interference area over the whole recording surface without disturbing the interference pattern. For this technique to work efficiently, the moving mirror must move without any angular deviation and the many mirrors involved must all be of a very high flatness. To write very large gratings (10–20 cm long or more), many large high quality mirrors are needed which may significantly increase the costs of the setup.

Another technique developed by Asseh et al. (J. Light. Tech., Vol15, No8 1997 pp1419–1423) is based on multiple consecutive exposures for extending the length of the grating. Each sub-grating is produced by a two-beam interferometer over a small area. The recording plane is moved at a constant speed under the small interference area and the position is monitored using a high precision interferometer. The pulsed laser used is fired at specific positions to maintain the phase of the grating along the length of the grating. This technique is very flexible, does not need large optics, but requires high precision feedback electronics.

OBJECT AND SUMMARY OF THE INVENTION

It is therefore an object of the present invention to provide a system and method for recording a long grating into a photosensitive medium that does not require either large collimating optics or high precision feedback electronics.

Accordingly, the present invention provides an interferometric recording system for recording interference fringes in a photosensitive medium extending in a recording plane.

The system includes light generating means for generating first and second coherent light beams, and a guiding assembly for respectively guiding the first and second light beams along first and second light paths. Both light paths lead to a recording location on the photosensitive medium. The first and second light beams generate the interference fringes at the recording location. The guiding assembly includes a delay mirror disposed in the first light path to reflect the first light beam. This delay mirror is interdependent with the photosensitive medium and forms a fixed angle $\phi$ with the recording plane.

The system according to the invention also includes translating means for translating the photosensitive medium and the delay mirror with respect to the first and second light paths. In this manner, the recording location moves along the photosensitive medium and the interference fringes move along the recording location, the angle $\phi$ being selected to operationally couple this moving of the recording location and interference fringes.

In accordance with an alternate embodiment of the invention, the system also includes a stabilizing mirror disposed in the second light path to reflect the second light beam. The stabilizing mirror is also interdependent with the photosensitive medium. The translating means translates this stabilizing mirror with respect to the first and second light path.

The present invention further provides a method for recording interference fringes in a photosensitive medium extending in a recording plane. The method includes the steps of:

a) generating first and second coherent light beams;
b) respectively guiding the first and second light beams along first and second light paths leading to a recording location on the photosensitive medium, the first and second light beams generating the interference fringes at the recording location, the first light beam being reflected on a delay mirror disposed in the first light path, the delay mirror being interdependent with the photosensitive medium and forming a fixed angle $\phi$ with the recording plane; and
c) translating the photosensitive medium and the delay mirror with respect to the first and second light paths, thereby moving the recording location along the photosensitive medium and moving the interference fringes along the recording location, the angle $\phi$ being selected to operationally couple said moving of the recording location and interference fringes.

Other features and advantages of the present invention will be better understood upon reading of preferred embodiments thereof with reference to the appended drawings.

DESCRIPTION OF PREFERRED EMBODIMENTS OF THE INVENTION

Figure 1:
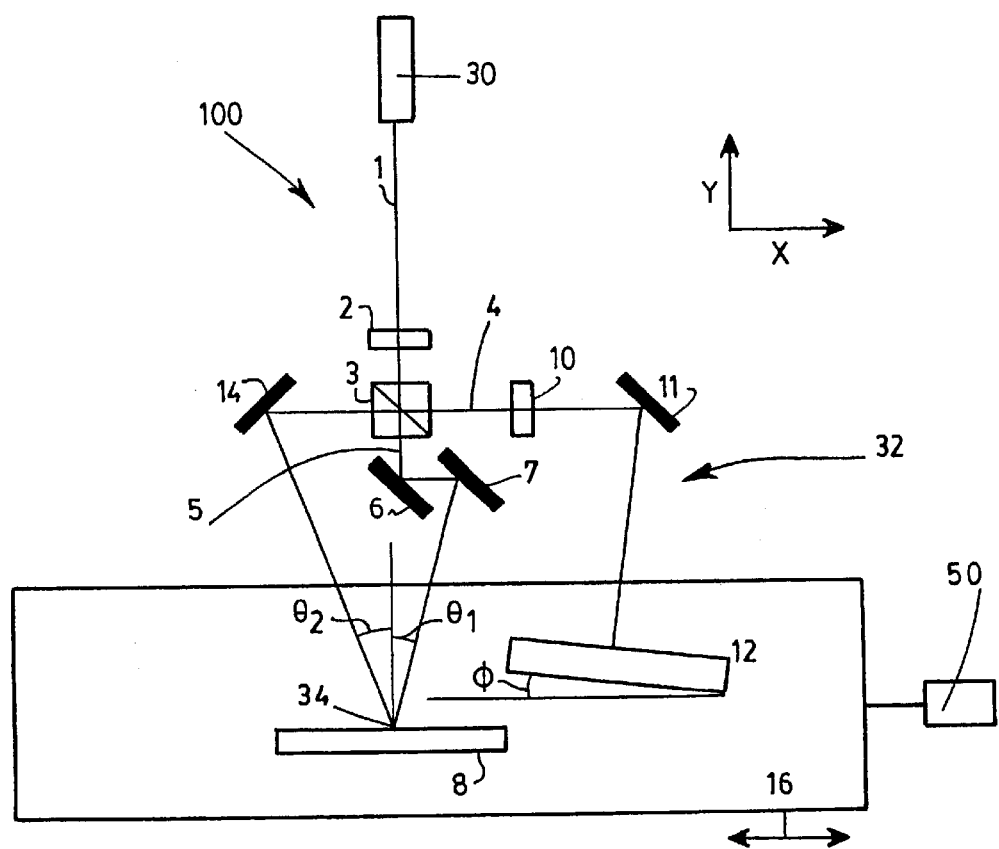
FIG. 1 is a schematized representation of a system according to a first embodiment of the present invention.

With reference to FIG. 1, there is shown a system 100 for recording interference fringes in a photosensitive medium 8 according to a first embodiment of the present invention. The photosensitive medium 8 is said to extend in a recording plane, which in the illustrated embodiments is defined as the x-z plane. The photosensitive medium may be made of any appropriate material such as optical fiber, photoresist, photopolymer, dichromated gelatin or photosensitive glass.

The interference fringes are preferably a sinusoidal variation of intensity defining a pattern having a period Λ calculated by:

$$\Lambda = \frac{\lambda}{\sin\theta_1 - \sin\theta_2},$$

where λ is the wavelength of the laser, $\theta_1$ and $\theta_2$ are respectively the angles of incidence of both beams 4 and 5 relative the normal of the recording plane (positive clockwise, negative counterclockwise).

The system 100 first includes light generating means for generating first and second coherent light beams 4 and 5. Preferably, a light source 30 such as laser provides a source beam 1, which is then divided by a beamsplitter 3 into the two coherent light beams 4 and 5. Guiding optics could of course be provided to lead the source beam 1 to the beamsplitter 3 if the light source 30 is not directly in alignment therewith. It is however understood that any other manner of generating two coherent light beams could be used within the scope of the present invention.

A guiding assembly 32 is also provided, and generally includes all the appropriate optical components used to guide the light beams 4 and 5 to the photosensitive medium 8, respectively following a first and a second light path. Both the first and second light beams 4 and 5 are incident on a same recording location 34 on the photosensitive medium 8, where they interfere together to generate the interference fringes.

In the preferred embodiment, the properties of polarized light are used to properly direct the first and second light beams 4 and 5 through the guiding assembly 32. It is however understood that any other guiding schemes allowing proper redirection of the two light beams may equally be used. In this embodiment, the light source 30 is a laser and the source beam 1 is a highly coherent linearly polarized laser beam. The source beam 1 preferably passes through a half-waveplate 2 and is split into the first and second light beams 4 and 5 by the polarizing beamsplitter 3. The half-waveplate 2 is used to adjust the relative intensity between beam 4 and 5 at the recording plane 8. During scanning, this relative intensity may be locally varied so as to vary the contrast of the interference pattern being recorded.

The second beam 5 is directly guided by mirrors 6 and 7 to the photosensitive medium 8 at an angle $\theta_1$ from the normal of the recording plane. The first light beam 4 passes through a quarterwave plate 10 to form circularly polarized light. It is then redirected by a mirror 11 toward a delay mirror 12, on which it impinges at normal incidence. The delay mirror 12 is interdependent with the photosensitive medium 8, and forms a fixed angle φ with the recording plane. This first beam 4 is then reflected into itself, is reflected again by mirror 11 back along its original path, and again passes through the quarterwave plate 10 to form linearly polarized light that is unaffected by the polarizing beamsplitter 3. The beam is then reflected by a mirror 14 to finally impinge on the recording plane at an angle $\theta_2$.

The system 100 of the present invention also includes means for translating the photosensitive medium 8 and the delay mirror 12 with respect to the first and second light paths 4 and 5. In a preferred configuration, the photosensitive medium 8 and the mirror 12 are fixed on a translation stage 16 operated by a motor 50, jointly moving both the photosensitive medium 8 and the mirror 12 along a direction parallel to the recording plane chosen in the present case to be the X direction. However, the invention is not limited to this embodiment. For example, in another possible configuration the photosensitive medium 8 and the mirror 12 may be stationary while the other components can be on a translation stage, thereby moving the first and second light paths 4 and 5 with respect to the photosensitive medium 8 and the delay mirror 12. A combination of those two setups or any other translating devices could also be used. Advantageously, the length of the recording is thereby only limited by the size of the delay mirror 12.

The translation described above has two effects. It moves the recording location 34 along the photosensitive medium 8, and moves the interference fringes along the recording location 34 itself. With a proper selection of the angle φ, these two movements of the recording location and interference fringes are operationally coupled, so that the interference pattern reproduced in the photosensitive medium 8 has proper fringes as opposed to a blurred refractive index change.

Figure 2:
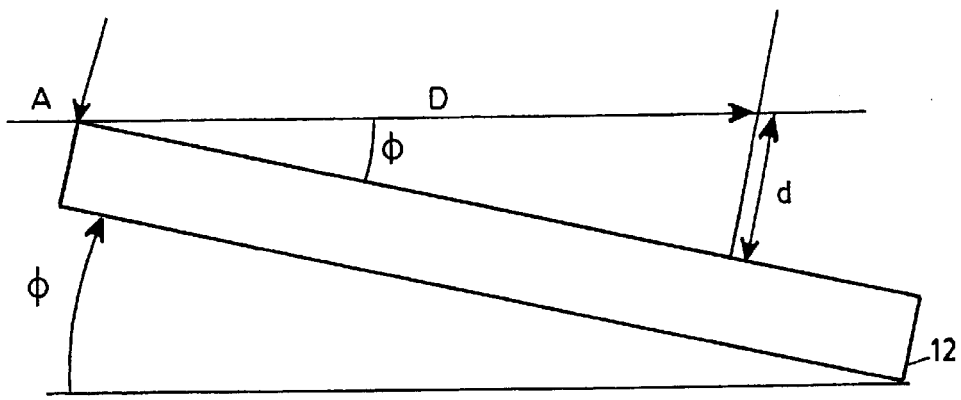
FIG. 2 is a representation of the delay mirror 12 of the embodiment of FIG. 1 showing the parameters used to compute the angle φ.

With reference to FIG. 2, a preferred manner of selecting the angle φ for the embodiment described above is explained.

Let the first light beam 4 be incident normally to the delay mirror 12 at position A. The mirror is inclined at an angle φ. The mirror 12 then moves laterally by a distance D. The light beam 4 is now incident on the mirror at position B. The path length difference of the light beam resulting from the change from position A to position B is two time d, which is given by the following equation:

$$d = D \sin \varphi$$

If the distance D is equal to one fringe period Λ, the required path length difference 2d to maintain the fringes stationary relative to the recording plane should be equal to one wavelength λ. The previous equation then becomes:

$$\lambda = 2\Lambda \sin \varphi$$

In this manner, the required inclination φ of the mirror 12 may be simply calculated based solely on the recorded period Λ and the recording wavelength λ:

$$\varphi = \sin^{-1}\left(\frac{\lambda}{2\Lambda}\right)$$

In the present embodiment, this angle should be calculated clockwise.

Figure 3:
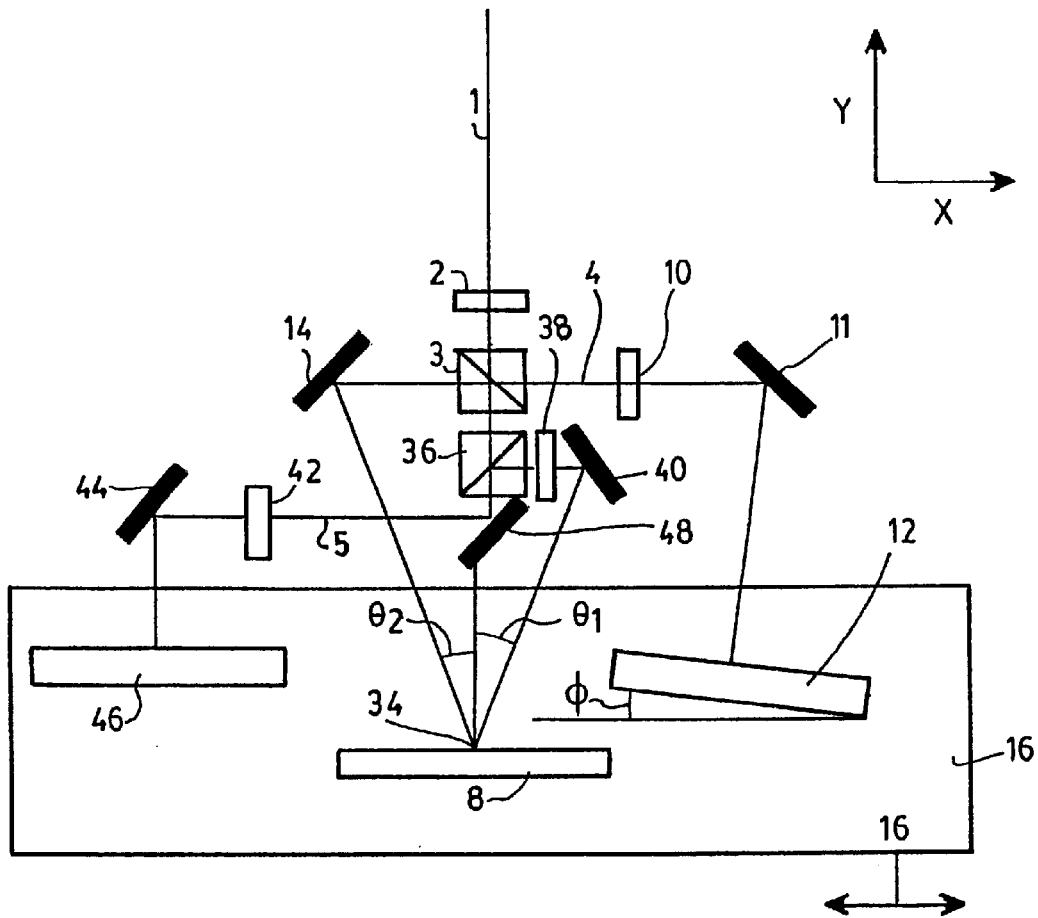
FIG. 3 is a schematized representation of a system according to a second embodiment of the present invention.

With reference to FIG. 3, there is shown a second preferred embodiment of the present invention. This embodiment is particularly advantageous in that it provides a system less sensitive to imperfections in the translation.

Any translation stage moving in a direction X, for example, also has some minor displacement in the Y and Z directions and some minor angular movements. Since, in FIG. 1, beams 4 and 5 do not follow a similar path and beam 4 is reflected by the mirror 12, any relative movement in the Y direction and any angular movement in the X-Y plane may result in fringe blurring from a small dephasing of beam 4 relative to beam 5. In order to make the system less sensitive to imperfect translation, both interfering beams must undergo the same dephasing caused by the imperfect translation.

In the embodiment of FIG. 3, as before, a highly coherent linearly polarized laser light beam 1 passes through a half-waveplate 2 and is split into a first and a second light beam 4 and 5 by the polarizing beamsplitter 3. Having an appropriate polarization, the second light beam 5 passes unaffected through a second polarizing beamsplitter 36, and is then redirected by a mirror 48 through a quarterwave plate 42 to form circularly polarized light. It is then reflected by a mirror 44 to impinge normally on a stabilizing mirror 46 extending in parallel to the recording plane. The second light beam 5 is then reflected back into itself, reflected again by a mirror 44, and passes again through the quarterwave plate 42 to form linearly polarized light. It is then reflected again by a mirror 48, redirected by the polarizing beamsplitter 36, and passes through a half wave plate 38 to turn back the polarization to the proper linear orientation. It is finally redirected by a mirror 40 to the photosensitive medium 8 where it impinges at the recording location 34 forming an angle $\theta_1$ with the normal of the recording plane.

The first light beam 4 follows a path similar to the one of the previous embodiment. It passes through a quarterwave plate 10 to form circularly polarized light, and is then redirected by mirror 11 towards delay mirror 12 on which it is reflected at normal incidence. The delay mirror 12 makes an angle $\phi$ relative to the recording plane. The first beam 4 is then reflected into itself, reflected again by mirror 11, then passes again through quarterwave plate 10 to form linearly polarized light that is unaffected by the polarizing beamsplitter 3. The beam is then reflected by mirror 14 to finally impinge on the recording location 34 of the photosensitive medium 8 at an angle $\theta_2$.

In this embodiment, the photosensitive medium 8, the delay mirror 12 and the stabilizing mirror 46 are all interdependent. They are fixed relative to each other and are translatable together by the translating means. As with the previous embodiment, these components may be mounted on a translation stage 16 and moved together along a direction in the recording plane, or they alternatively could be immobile while the first and second light paths 4 and 5 are themselves moved along a similar direction.

At the recording location 34, both impinging beams 4 and 5 interfere to form light and dark fringes. By translating the stage 16 with respect to the light paths of the first and second light beams 4 and 5, the recording location 34 is scanned across the length of the recording plane. The angle $\phi$ of the delay mirror 12 is adjusted so as to delay beam 4 relative to beam 5 in a way to maintain the interference pattern fixed relative to the recording plane during the translation. The length of the recording is only limited by the size of mirrors 46 and 12.

As before, the half-waveplate 2 may be used to adjust the relative intensity between beam 4 and 5 at the recording location 34. During scanning, this relative intensity may be locally varied so as to vary the contrast of the interference pattern being recorded.

Figure 4:
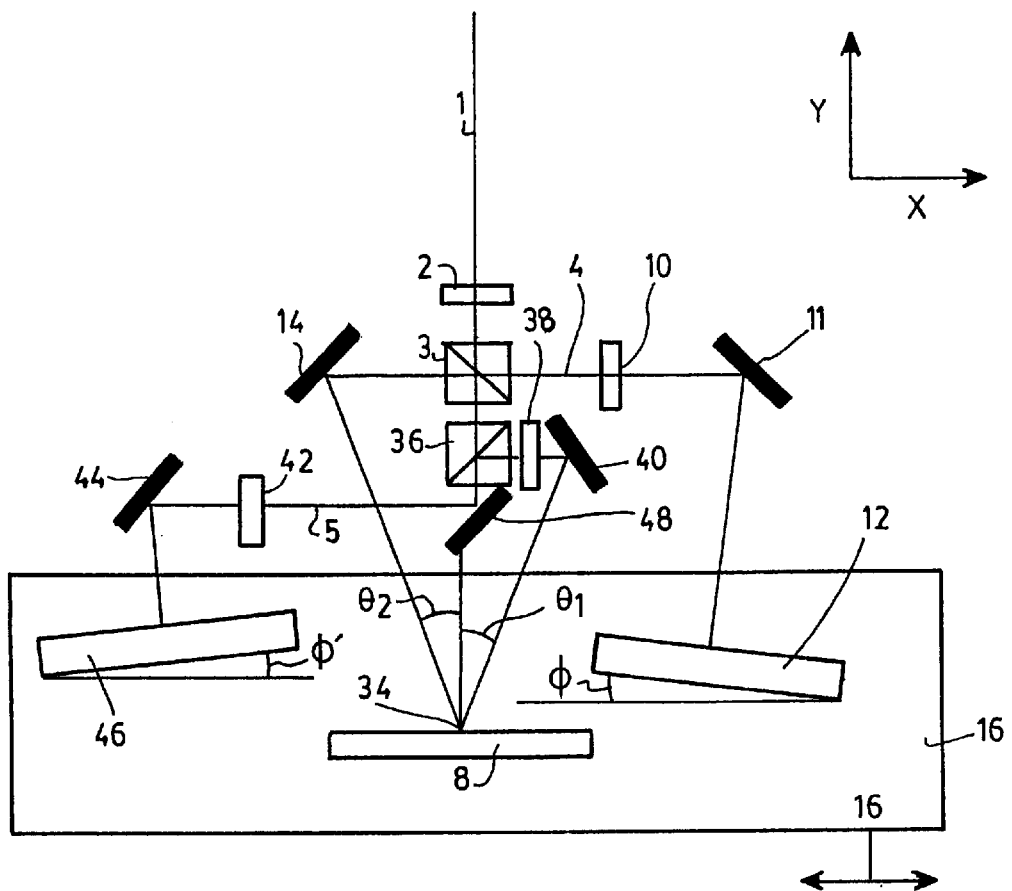
FIG. 4 is a schematized representation of a system according to a third embodiment of the present invention.

Referring to FIG. 4, there is shown a third embodiment of the present invention similar to the embodiment of FIG. 3. In this new configuration, the stabilizing mirror 46 makes an angle $\phi'$ with the recording plane. The angle $\phi'$ is preferably the same as the angle $\phi$ of the delay mirror 12, but in an opposite direction to maximize the symmetry for both beam paths. In that case, the angles $\phi$ and $\phi'$ should both have a value of about half of the value of angle $\phi$ in the case where the stabilizing mirror 46 is parallel to the recording plane. In this configuration, the system becomes insensitive to a minor Y translation of the stage since both beams are affected in the same way. In addition, it is less sensitive to angular movement in the X-Y plane, since the first light beam 4 impinges on the recording plane by the left side while being reflected by the delay mirror 12 on the right side of the recording plane, while the second light beam 5 impinges on the recording plane by the right side while being reflected by the stabilizing mirror 46 on the left side. Since both light beams 4 and 5 are going to the recording location by the right and left side of the recording plane, the undesired angular movement of the translating stage affects both beams almost the same way, minimizing the angular effects.

In accordance with another aspect of the present invention there is also provided a method for recording interference fringes in a photosensitive medium extending in a recording plane. The method includes the following steps of:
a) generating first and second coherent light beams.

To this end, there are preferably performed sub-steps of i) generating a source light beam, and ii) splitting this source light beam into the first and second coherent light beams.
b) respectively guiding the first and second light beams along first and second light paths leading to a recording location on the photosensitive medium.

The first and second light beams generate the interference fringes at the recording location. Within this step, the first light beam is reflected on a delay mirror disposed in the first light path. The delay mirror is interdependent with the photosensitive medium and forms a fixed angle $\phi$ with the recording plane. In a preferred embodiment, the second light beam may be reflected on a stabilizing mirror disposed in the second light path, this stabilizing mirror being interdependent with the photosensitive medium.
c) translating the photosensitive medium and the delay mirror with respect to the first and second light paths In this manner the recording location is moved along the photosensitive medium and the interference fringes are moved along the recording location. The angle $\phi$ is selected to operationally couple these movements of the recording location and interference fringes and is preferably given by the following relation:

$$\phi = \sin^{-1}(\lambda/2\Lambda)$$

where $\lambda$ is a wavelength of said first and second light beams and $\Lambda$ is a period of said interference fringes. If a stabilizing mirror is provided, it should also be translated with respect to the first and second light paths.

Of course, numerous modifications could be made to the embodiments described above without departing from the scope of the invention as defined in the appended claims.

What is claimed is:

1. An interferometric recording system for recording interference fringes in a photosensitive medium extending in a recording plane, the system comprising:

light generating means for generating first and second coherent light beams;

a guiding assembly for respectively guiding the first and second light beams along first and second light paths leading to a recording location on the photosensitive medium, the first and second light beams generating the interference fringes at the recording location, the guiding assembly comprising a delay mirror disposed in the first light path to reflect the first light beam, the delay mirror being interdependent with the photosensitive medium and forming a fixed angle φ with the recording plane; and translating means for translating both the photosensitive medium and the delay mirror together with respect to the first and second light paths, thereby moving the recording location along the photosensitive medium and moving the interference fringes along the recording location, the angle φ being selected to operationally couple said moving of the recording location and interference fringes.

2. An interferometric system according to claim 1, wherein said translating means comprise a translation stage for supporting the photosensitive medium and the delay mirror.

3. An interferometric system according to claim 2, wherein said translating stage is moveable along a direction parallel to the recording plane.

4. An interferometric system according to claim 1, wherein said light generating means comprise:

a light source for generating a source light beam; and a beamsplitter for splitting said source light beam into the first and second coherent light beams.

5. An interferometric system according to claim 1, wherein said angle φ is given by the relation:

$$\phi = \sin^{-1}(\lambda/2\Lambda)$$

where $\lambda$ is a wavelength of said first and second light beams and $\Lambda$ is a period of said interference fringes.

6. An interferometric system according to claim 1, wherein the guiding assembly further comprises a stabilizing mirror disposed in the second light path to reflect the second light beam, said stabilizing mirror being interdependent with the photosensitive medium, the translating means translating said stabilizing mirror with respect to the first and second light path.

7. An interferometric system according to claim 6, wherein said stabilizing mirror extends in parallel to the recording plane.

8. An interferometric system according to claim 6, wherein said stabilizing mirror forms an angle θ with the recording plane selected to cooperate with said angle φ to operationally couple said moving of the recording location and interference fringes.

9. An interferometric system according to claim 6, wherein said translating means comprise a translation stage for supporting the photosensitive medium, the delay mirror and the stabilizing mirror.

10. An interferometric system according to claim 9, wherein said translating stage is movable along a direction parallel to the recording plane.

11. A method for recording interference fringes in a photosensitive medium extending in a recording plane, the method comprising steps of:

a) generating first and second coherent light beams;

b) respectively guiding the first and second light beams along first and second light paths leading to a recording location on the photosensitive medium, the first and second light beams generating the interference fringes at the recording location, the first light beam being reflected on a delay mirror disposed in the first light path, the delay mirror being interdependent with the photosensitive medium and forming a fixed angle φ with the recording plane; and c) translating both the photosensitive medium and the delay mirror together with respect to the first and second light paths, thereby moving the recording location along the photosensitive medium and moving the interference fringes along the recording location, the angle φ being selected to operationally couple said moving of the recording location and interference fringes.

12. A method according to claim 11, wherein step a) comprises the substeps of:

i) generating a source light beam; and ii) splitting said source light beam into the first and second coherent light beams.

13. A method according to claim 11, wherein, in step b) said angle φ is given by the relation:

$$\phi = \sin^{-1}(\lambda/2\Lambda)$$

where $\lambda$ is a wavelength of said first and second light beams and $\Lambda$ is a period of said interference fringes.

14. A method according to claim 11, wherein:

step b) further comprises reflecting the second light beam on a stabilizing mirror disposed in the second light path, said stabilizing mirror being interdependent with the photosensitive medium; and step c) comprises translating said stabilizing mirror with respect to the first and second light path.

* * * * *